United States Patent Office 3,174,231
Patented Mar. 23, 1965

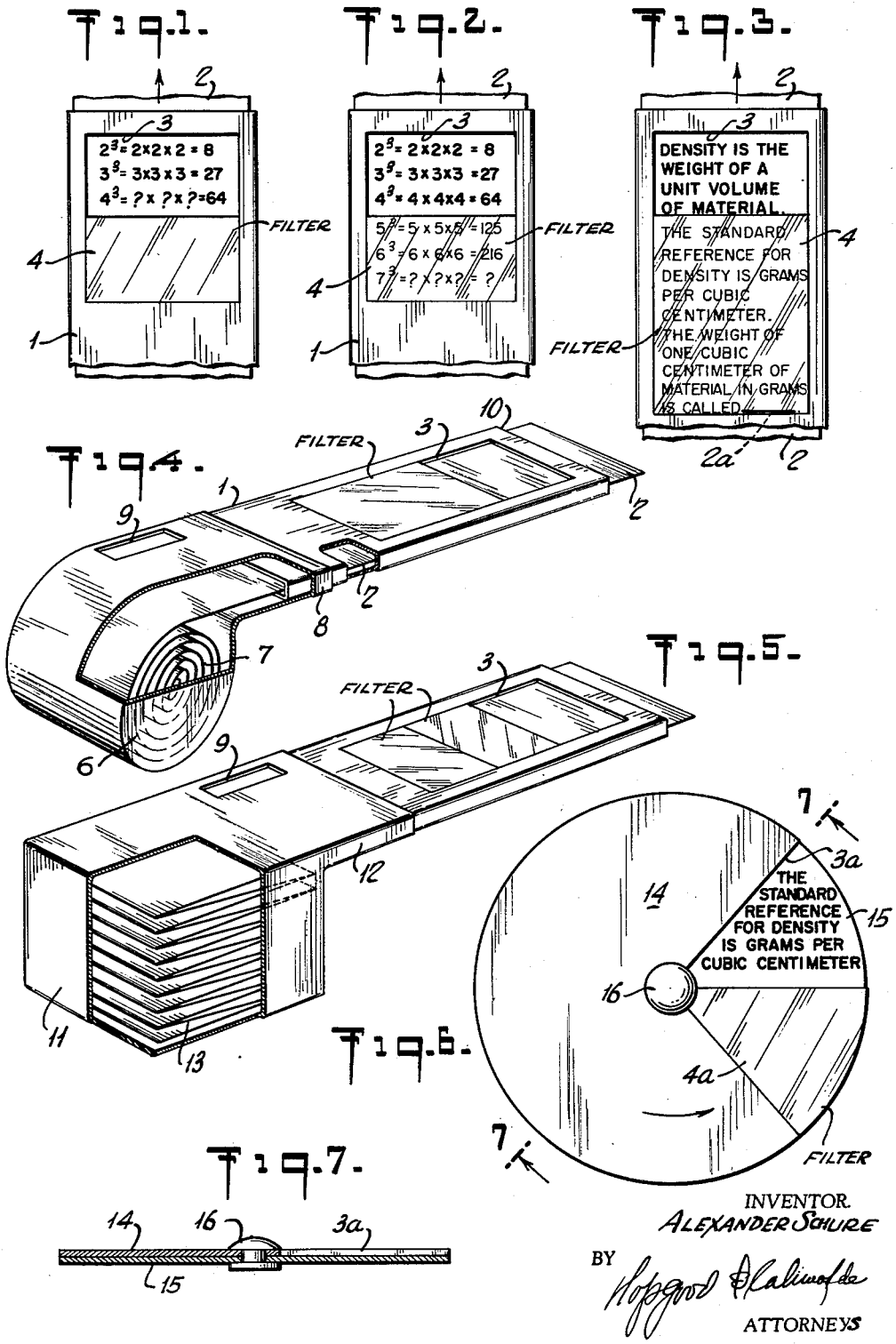

3,174,231
MATRIX FOR TEACHING DEVICE FOR SELECTIVELY EXPOSING AND CONCEALING STIMULI
Alexander Schure, 274 Beach 141st St.,
Belle Harbor, N.Y.
Filed Dec. 5, 1962, Ser. No. 242,433
3 Claims. (Cl. 35—8)

This invention relates to a teaching device of simple construction and, in particular, to a device characterized by an observation station or aperture of predetermined size adapted for revealing a frame of stimuli on sheet material, but which observation station can be varied in its viewing range to accommodate effectively a larger frame of stimuli without requiring the use of moving parts or a complicated association of movable elements.

The pressing need for improving the efficiency of educational processes has led to the introduction of teaching devices having as their function to increase the teacher's control over learning activities within the class room and to improve the students' learning efficiency outside the class room. Such devices are designed with the function of presenting information in a carefully planned sequence in the form of frames of stimuli of selected educational content on a carrier sheet and of revealing the stimuli through a stationary window or cut-out, the size of the frames of stimuli generally conforming to the size of the window.

Devices of this type usually provide a means by which the students are enabled to indicate their response to stimuli relating to the material presented and then immediately thereafter check the correctness of their response. In this way, students can check their progress as they proceed. I disclose a teaching device of this general type in my U.S. Patent No. 3,046,675 (granted July 31, 1962), which device is somewhat structurally simple, inexpensive and amenable to mass production techniques from such materials as paper, plastic, cardboard or other inexpensive materials of construction.

The trend continues towards more simple devices, particularly devices having a greater versatility of use in the presentation of stimuli unrestricted by the size of the window or observation station.

It is therefore an object to provide a teaching device of simple construction having an observation station, or stations, the viewing range of which is variable depending on the characteristics of the stimuli to be observed.

Another object is to provide a viewing matrix and a program sheet therefor, wherein the viewing portion of the matrix cooperably associated with the stimuli on the program sheet is capable of providing a variable viewing range depending upon the stimuli to be observed.

A further object is to provide in combination a viewing matrix and a program sheet, wherein the viewing portion of the matrix is cooperatively related to the program sheet to reveal selectively branching data, i.e. alternate information paths, either directly or by referral.

These and other objects will more clearly appear when taken in conjunction with the disclosure and the accompanying drawing, wherein:

FIGS. 1 to 3 are fragmentary views of a matrix and program sheet combination illustrating various embodiments of my invention;

FIGS. 4 and 5 are illustrative of my device when used in combination with means for holding the program sheet for feeding through the matrix;

FIG. 6 is another embodiment of my device utilizing a circular matrix overlying a circular program sheet, the parts being in masking and rotatable relation with each other; and FIG. 7 is a cross section taken along line 7—7 of FIG. 6.

In its broad aspects, my teaching device comprises a matrix adapted to receive and expose consecutive frames of stimuli arranged as programmed material on a sheet. The matrix has an observation station associated therewith comprising a window cut-out of predetermined size corresponding to the minimum size of a unit frame of stimuli and adapted to expose the same. Below the cut-out is an extension of the observation station or window in the form of a color filter having the property of masking stimuli portions whose color is compatible with that of the filter but which filter is transparent to stimuli portions whose color is incompatible with that of the filter. Thus, it is possible to enlarge the field of view and expose more stimuli when it is desired, depending upon the color of the stimuli and their arrangement relative to stimuli of different color. For example, assuming that the color filter is red and that the normal stimuli are colored red, the filter will completely mask the stimuli passing thereunder until they reach the cutout portion for viewing. However, in circumstances where it is desired to reveal several frames of stimuli at one time, then part of the stimuli would be printed in a different color so that the stimuli exposed at the cut-out portion of the window may be combined in educational content with the stimuli viewable through the filter, thereby increasing the viewing range of the observation station and the effective frame size of the stimuli. This will clearly appear from FIGS. 1 to 3.

In FIG. 1, I show fragmentarily a matrix 1 made of fairly stiff composition paper, or other suitable material, of substantially flat configuration in the nature of a flat tube sheet having a rectangular opening running longitudinally therethrough containing a program sheet 2 carrying stimuli thereon. The matrix has a rectangular window or cut-out 3 on the top surface thereof of a predetermined size to expose a frame of stimuli as shown in FIG. 1. Immediately below the window a color filter 4 is provided which may, if desired, correspond in size to the rectangular cut-out above it, but need not be limited so. For example, the filter may be double or triple the size of the cut-out in situations where it is desired to reveal an amount of stimuli corresponding to two or three times the axis of the cut-out, particularly where a large amount of information is required to be presented for a given problem.

Or, alternatively, the additional space may be desired for "branching" stimuli. For example, if a student makes an incorrect response to a programmed problem exposed in the cut-out, simultaneously beneath the filter "branching" stimuli appear, either providing the additional information immediately, or in the nature of referral data directing the student to alternate information in a text book or the like.

FIG. 2 shows how the matrix operates when stimuli of double the frame size is to be revealed. Assuming the stimuli (a mathematical problem) presented in cut-out 3 is colored red and filter 4 is red, then this frame of stimuli would be masked by the filter as sheet 2 passes underneath the filter until the stimuli reaches the cut-out. If more information is required, then the additional stimuli would be printed in a different color, e.g. blue, incompatible with the color of the filter so that the stimuli can be seen through the filter as shown in FIG. 2. FIG. 3 illustrates a matrix in which the viewing window of the filter is about twice the size of the cut-out so that taken together they reveal a frame of stimuli three times the unit size or the size of the cut-out.

It will be apparent from the foregoing that I provide a matrix structure which, because of its simplicity, lends itself in a variety of ways as an element in teaching devices. Referring to FIG. 4, I show partially broken away a cartridge-type container 5 comprising a portion 6 of substantially cylindrical configuration adapted to hold a scroll 7 of program sheet material 2. A mouth portion 8 communicates substantially tangentially with the cylindrical portion through which the programmed sheet is fed.

In this embodiment, I show the cartridge in telescopic cooperation via the mouth portion with matrix 1. An aperture 9 is provided on the cartridge to enable one to start the feeding of the programmed sheet until it reaches cut-out 3 and extends outside the end 10 of the matrix. As described for FIGS. 1 to 3, a filter is provided below window cut-out 3 adapted to conceal certain stimuli and adapted to be transparent to others. In using the combination shown, the cartridge portion would just extend off the edge of a desk to insure a flat writing surface for the student. Assuming the problem to be such as to cover the equivalent of three frames as shown in FIG. 3, sheet 2 would be moved through the matrix until the complete problem of FIG. 3 comes to view as follows:

Density is
the weight
of a unit
volume of material

The standard reference
for density
is grams per
cubic centimeter

The weight of
one cubic
centimeter of
material in grams
is called _____.

The filter would be transparent to the last two statements since they would be printed in a color incompatible with the filter. After studying the problem, the student would then move sheet 2 through the matrix until the last statement of the problem reaches window cut-out for insertion of his answer in blank space 2a provided for that purpose. In the meantime, any stimuli following the last statement would be in a color compatible with that of the filter and be concealed. For example, the stimuli following the last statement might give the correct answer which answer would be concealed from view below cut-out 3 and come into view only after the problem has been answered.

FIG. 5 shows another embodiment similar to that of FIG. 4 but adapted to use program sheets arranged in a folded or accordion pleated manner in a cartridge type container 11 of substantially rectangular configuration except for an extending mouth portion 12 through which the accordion pleated program sheet 13 is fed. An aperture 9 is similarly provided for use in finger feeding the program sheet. Such apertures may also serve the function of indexing the position of the program sheet if desired.

A still further embodiment of the invention is shown in FIGS. 6 and 7. Here the matrix is shown as a flat disc 14 connected centrally to an underlying disc 15 by rivet 16, the underlying disc corresponding to the program sheet. As in FIGS. 1 to 5, a cut-out window 3a is provided in the matrix as a sector and a filter 4a also in the form of a sector of the circular matrix. By moving one relative to the other as shown, stimuli are revealed in the cut-out while stimuli directly following thereafter may or may not be revealed depending upon their compatibility with the color of the filter. When used with branching stimuli, rotation of the disc could be adapted to operate a counter to give the teacher a good concept of error rate.

It is thus apparent that the matrix provided by my invention makes available a structurally simple, inexpensive device amenable to mass production methods, whereby it is capable of being manufactured at very low cost. The device may be made compromise proof as disclosed in my U.S. Patent No. 3,046,675 when the device is used for test purposes or may be used merely as a method of programmed teaching. For example, the stimuli may comprise material of an informational nature on a particular subject followed by questions which are answered by the student, immediately after which a correct answer is given to provide reinforcement for the student as an immediate check to his progress. In combination with the informational and question and answer stimuli, "branching" stimuli may be provided in the form of referral data to direct the student to text books for further study. It is quite apparent that despite the simpliciy of my device, it is characterized by versatility of use which lends itself to mass education at low cost.

It will be appreciated that the masking or concealing effect of the filter can be achieved in various ways. For example, only a portion of the stimuli need be of a color compatible with that of the filter. That is to say, every other word or stimulus, or critical words may be selectively concealed by the filter sufficient to render useless the educational content intended by the stimuli until they are completely exposed at the cut-out window. In this way, the observation station can be varied over any desired range to effectively conceal or expose one or more frames of stimuli.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A teaching device comprising a matrix having on its surface a viewing station comprising a first observation station having a window of predetermined size for accommodating and exposing at least one frame of stimuli, a second observation station adjacent said first station having a window of predetermined size comprising a color filter for accommodating at least one frame of stimuli, and a program sheet cooperatively associated with said matrix, said program sheet having thereon consecutive frames of stimuli programmed in a prearranged order depending upon information to be conveyed, at least one of said frames being printed in a color non-compatible with said color filter and at least one of said frames of stimuli being printed in a color compatible with said color filter whereby to be concealed by said filter, said program sheet being supported beneath said viewing station for feeding to and past said windows.

2. The teaching device of claim 1 wherein means are provided associated with said matrix for holding additional lengths of program material for feeding to and past said windows.

3. The device of claim 2 wherein said non-compatible stimuli contained in prearranged order on the program sheet include branching stimuli of color different from said color filter whereby said branching stimuli can be observed through said color filter.

References Cited by the Examiner

UNITED STATES PATENTS

| | | | |
|---|---|---|---|
| 1,422,527 | 7/22 | Berger | 35—26 |
| 2,169,266 | 8/39 | Matter | 35—9 |
| 2,707,115 | 4/55 | Rolleston | 281—44 |
| 2,840,073 | 6/58 | Zeltzer et al. | 128—76.5 |
| 3,081,088 | 3/63 | Kast | 35—9 |

JEROME SCHNALL, *Primary Examiner.*

LAWRENCE CHARLES, *Examiner.*